United States Patent [19]
Klaus et al.

[11] 4,143,898
[45] Mar. 13, 1979

[54] BUMPER FOR TRACK SUSPENSION OF A TRACKLAYING VEHICLE

[75] Inventors: Helmuth Klaus, Hagen-Haspe; Carl Fass, Ennepetal; Heinz Lause, Recklinghausen, all of Fed. Rep. of Germany

[73] Assignee: Intertrac Viehmann & Co., Gevelsberg, Fed. Rep. of Germany

[21] Appl. No.: 863,625

[22] Filed: Dec. 23, 1977

[30] Foreign Application Priority Data

Sep. 13, 1977 [DE] Fed. Rep. of Germany ....... 2741105

[51] Int. Cl.$^2$ ............................................ B61F 19/04
[52] U.S. Cl. .................................... 293/137; 213/221; 267/139
[58] Field of Search ............... 267/9 A, 138, 139, 166, 267/167, 170, 174, 175, 176, 177, 178, 179; 213/220, 221; 293/70, 85, 86, DIG. 5

[56] References Cited

U.S. PATENT DOCUMENTS

| 1,564,488 | 12/1925 | Nastri | 293/86 |
| 2,145,952 | 2/1939 | Ryan | 293/85 |
| 2,620,178 | 12/1952 | Lehman | 267/9 A |
| 3,084,809 | 4/1963 | Lucchese | 267/9 A |

FOREIGN PATENT DOCUMENTS

832878 4/1960 United Kingdom ..................... 213/220

*Primary Examiner*—Edward R. Kazenske
*Attorney, Agent, or Firm*—Karl F. Ross

[57] ABSTRACT

A bumper for a suspension of a tracklaying vehicle has a first plate formed with a throughgoing hole through which engages one longitudinal end of a bolt. The other longitudinal end of this bolt is screwed into a second plate that is therefore held at a maximum spacing from the first plate. A helical compression spring having in unstressed condition an overall length greater by a predetermined distance than this maximum spacing is braced in compressed condition between the plates. Two telescoping sleeves, one fixed to each of the plates, coaxially surrounds the rod and have free ends extending past each other. Each of these ends has a respective abutment and these two abutments are spaced apart by a distance substantially equal to the difference between the length of the spring in the compressed and uncompressed condition. Thus should this rod break the two abutments will engage each other and prevent the first plate from being violently ejected.

10 Claims, 1 Drawing Figure

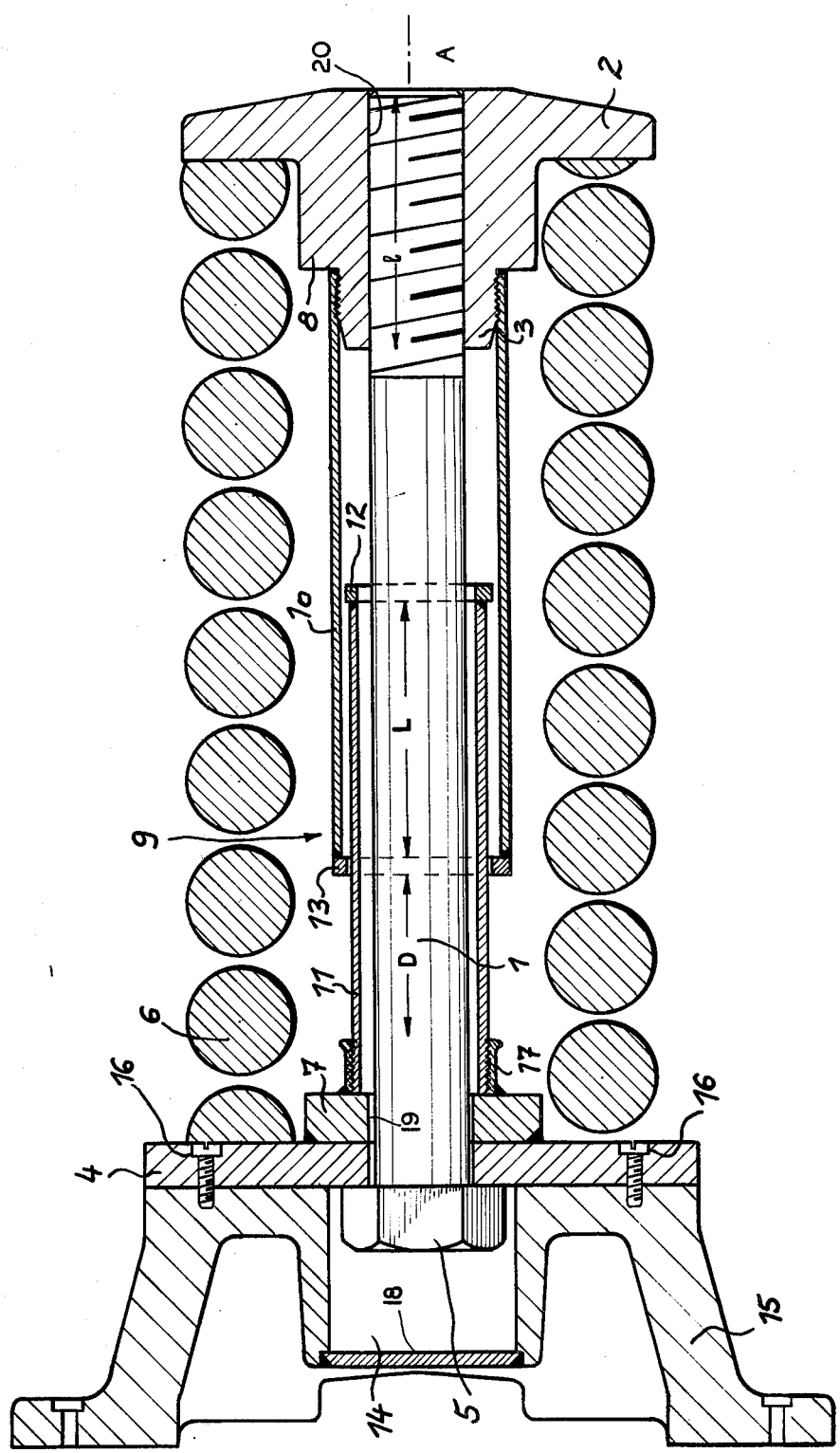

BUMPER FOR TRACK SUSPENSION OF A TRACKLAYING VEHICLE

FIELD OF THE INVENTION

The present invention relates to a bumper. More particularly, this invention concerns a bumper usable in the suspension of a tracklaying vehicle as a bumper stop support for a road or idler wheel, or for a track support roller.

BACKGROUND OF THE INVENTION

The various wheels and rollers that guide the track of a tracklaying vehicle and that support the vehicle on the track are typically provided with bumpers so that the vehicle, which may be a crane, earthmover, steam shovel, or the like, can move along highly irregular ground without damaging these parts of its track suspension. In particular when a rock or the like comes between the track and one of its wheels or rollers it is necessary that this wheel or roller be able to deflect inwardly considerably. At the same time this deflection must be resisted with a considerable force. (See pp. 385-9. Principles of Automotive Vehicles, U.S. Gov't Printing Office, Washington, D.C. 1956).

The typical such element is simply formed as a preloaded or prestressed unit having a bumper plate and a mounting plate one of which is welded to one end of a rod whose other end passes through a hole in the other plate and has a head to the other side of this other plate. Thus the two plates can move toward each other. A very heavy compression spring is braced in compressed condition between these two plates so that when the bumper plate engages the support arm or the like of the respective wheel or roller it resists further displacement of this support arm with a considerable force.

Such an arrangement has two considerable disadvantages. First of all it is a relatively difficult matter to assemble and service this welded-together unit. Checking the condition of the welds is almost impossible and any adjustment of the prestressing of the spring is also impossible. Furthermore such units break occasionally and present an enormous hazard to any nearby person, as once the rod or stem between the two plates breaks or becomes disattached from either plate a bumper plate is thrown out violently by the spring. Indeed it is possible for such a bumper plate to be ejected with such force that it can cause grave injury or death to a nearby person. It is not uncommon for the compression spring to be prestressed with a force in the neighborhood of 20Mp. (20,000 Kg force).

OBJECTS OF THE INVENTION

It is therefore an object of the present invention to provide an improved bumper of the above-described general type for use in a tracklaying vehicle.

Another object is to provide such a bumper which can easily be assembled, disassembled, and serviced even in the field.

A further object is to provide such a bumper which, should the stem between the two plates fail, does not present a hazard to a nearby person.

SUMMARY OF THE INVENTION

These objects are attained according to the present invention in a bumper of the above-described general type but wherein a pair of telescoping sleeves are provided, one connected to the one plate and the other to the other plate. The inner sleeve has an outwardly extending abutment and the outer sleeve has an inwardly extending abutment. These abutments are spaced longitudinally apart relative to the direction of elongation of the rod between the elements in the direction of stressing of the spring surrounding them by a distance at least equal to the difference between the length of the spring in its unstressed condition and its length when precompressed between the two plates. Thus should the rod break or become free at either end the two abutments will engage each other at approximately the same time as the spring is completely destressed so that sudden ejection of the bumper plate is avoided. Even if several such compression springs are provided around each other and around the rod, these telescoping sleeves will prevent the assembly from coming apart in case of failure of this rod.

According to another feature of this invention the rod is threaded at one of its ends into one of the plates by a distance at least equal to the difference between the length of the spring in an unstressed condition and the length of the spring when compressed between two plates. Thus the threaded plate can be screwed off the rod, but before coming free of the rod the spring will become completely destressed. Thus no complex press equipment is needed to assemble the device and the bumper can even be worked on in the field.

With the instant invention even if the force is so considerable that the abutments on the two telescoping sleeves fail, the energy absorbed in tearing the one or the other abutment off will effectively absorb most of the energy of the explosively failing bumper.

The telescoping sleeves may lie between the rod and the compression spring, or may surround and protect the rod and the compression spring or springs. Furthermore the rod has at the one plate, normally the mounting plate, a head or nut which is received in a closed compartment of this member so as further to protect the assembly. Should the head or nut break off the bolt it is therefore contained and can harm no one.

According to another feature of this invention each of the plates is formed with a longitudinally extending projection to which is screwed the respective sleeve. The bumper plate may be formed with the threaded bore receiving the one end of the threaded rod and may be formed with an annular sleeve forming at its interior this threaded bore and on its exterior threads for the interior of the outer sleeve. The other plate is formed with a small upwardly extending column having internal threads engaging the outer surface of the inner sleeve. Thus the entire assembly can be screwed together and apart and its parts replaced if necessary with ease.

BRIEF DESCRIPTION OF THE DRAWING

The sole FIGURE of the drawing is a longitudinal section through a bumper according to this invention.

SPECIFIC DESCRIPTION

A bumper according to this invention basically comprises a cylindrical rod or bolt 1 having one end threaded into a bore 20 of a bumper plate 2 and another end passing through a cylindrical bore 19 of a support plate 4, with the head or a nut 5 of the bolt 1 lying against the opposite face of this planar plate 4. A heavy-duty helical compression spring 6 coaxially surrounds the cylindrical rod or bolt 1 and bears at one end on the plate 4 and at the other end on the plate 2.

The plate 4 is welded to another small plate 7 carrying in turn a welded-on internally threaded collar 17 into which is threaded a tube or sleeve 11 forming the inner member of a telescoping sleeve assembly 9 whose outer member 10 bears at one end on a shoulder 8 of plate 2 and which is threaded in turn over an annular collar 3 of this plate 2. The plate 10 has an end 13 formed with an inwardly extending collar or rim constituted by a welded-on ring, and a corresponding abutment 12 is provided on the end of the sleeve 11, but extending outwardly therefrom.

The head or nut 5 of the bolt 1 is received in a short cylindrical compartment 14 covered by a welded-on plate 18 in a mounting flange or body 15 secured via bolts 16 to the plate 4.

The two abutments 12 and 13 are spaced longitudinally apart by a distance L which is approximately equal to the distance through which the spring 6 would expand from its illustrated compressed condition if relaxed fully. If stressed fully so that the turns of the spring 6 abut the plate 2, rod 1, and sleeve 10 could be moved over to left in the FIGURE through through a distance D which is shorter than the distance through which the abutment 13 would have to move to engage the collar 17 or through which the head 5 would have to move to engage the plate 18. Furthermore the end of the rod 1 is threaded a distance l into the bore 20, the distance l being slightly greater than the distance L. Thus even with the spring 6 in a completely unstressed condition it is possible to screw the plate 2 over the rod 1. Means is provided for locking the plate 2 on the rod 1 to prevent relative rotation after assembly.

It is possible to disassemble the entire device, after removing the setscrew or the like that prevents rotation of the bumper plate 2 relative to the rod 1, simply by unscrewing this element 2 until it comes off the end of the bolt 1. Then the entire assembly of the plate 2 and sleeve 10, as well as the spring 6, is pulled to the left as shown in the FIGURE and the sleeve 11 is unscrewed from the collar 17. Thereafter the spring can be removed from this assembly and the sleeve 10 can even be removed from the collar 3. It is possible at this time to replace any of the parts 2, 6, 10 or 11. The entire assembly can then be put back together in the reverse order. This operation can be carried out in the field with relatively simple tools, no press or the like being needed to assemble the unit.

Should the rod 1 fail, as for instance by breaking-off of its head 5, and the spring 6 will instantaneously expand through a distance equal approximately to the distance L. Once it has expanded this distance the abutments 12 and 13 will engage each other so as to prevent the plate 2 from being too rapidly ejected. This will protect any nearby person from being struck a violent blow by this element 2.

We claim:

1. A bumper for a track suspension of a tracklaying vehicle, said bumper comprising:
   a first plate having a throughgoing hole;
   an elongated rod extending through said hole and having one longitudinal end to one longitudinal side of said first plate and another longitudinal end having a wide part to the other longitudinal side of said hole;
   a second plate secured to said one longitudinal end of said rod and spaced by a predetermined distance from said first plate, said second plate being longitudinally displaceable with said rod toward said first plate;
   a helical compression spring having in unstressed condition an overall length greater by a predetermined difference than said predetermined distance and braced in compressed condition between said plates;
   an inner sleeve fixed to one of said plates, surrounding said rod, extending longitudinally from said one plate toward the other plate, and carrying an inner abutment; and
   an outer sleeve fixed to said other plate, surrounding said rod and at least a portion of said inner sleeve, extending longitudinally from said other plate toward said one plate, and carrying an outer abutment between said inner abutment and said one plate and spaced by a predetermined spacing at least as large as said predetermined difference from said inner abutment, whereby on failure of said rod and extension of said spring said abutments will only engage each other when said spring is substantially fully expanded.

2. The bumper defined in claim 1 wherein said sleeves coaxially surround said rod.

3. The bumper defined in claim 2 wherein said first plate includes a mounting member forming a compartment around said wide part.

4. The bumper defined in claim 3 wherein said one plate is said first plate.

5. The bumper defined in claim 2 wherein said wide part is a head on said rod.

6. The bumper defined in claim 2 wherein said one longitudinal end is threaded and said second plate has a threaded bore receiving said one longitudinal end.

7. The bumper defined in claim 6 wherein said one longitudinal end is threaded into said bore by a distance at least equal to said predetermined difference, whereby said second plate can be threaded onto said rod with said spring between said plates in unstressed condition.

8. The bumper defined in claim 2 wherein said inner sleeve has an inner end and said outer sleeve has an outer end, said inner end lying between said outer end and said other plate, said inner abutment being an outwardly projecting collar on said inner end and said outer abutment being an inwardly projecting collar on said outer end and longitudinally engageable with said inner abutment.

9. The bumper defined in claim 2 wherein at least one of said plates has a longitudinally extending threaded projection threaded into the respective sleeve.

10. The bumper defined in claim 9 wherein said other plate has said projection and is said second plate.

* * * * *